United States Patent
Mehta et al.

(10) Patent No.: US 9,047,124 B2
(45) Date of Patent: *Jun. 2, 2015

(54) QUERY SCHEDULER

(75) Inventors: Abhay Mehta, Austin, TX (US); Chetan Kumar Gupta, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 872 days.

This patent is subject to a terminal disclaimer.

(21) Appl. No.: 12/251,293

(22) Filed: Oct. 14, 2008

(65) Prior Publication Data

US 2010/0094828 A1    Apr. 15, 2010

(51) Int. Cl.
  *G06F 17/30*    (2006.01)
  *G06F 9/50*    (2006.01)

(52) U.S. Cl.
  CPC ...... *G06F 9/5027* (2013.01); *G06F 2209/5021* (2013.01)

(58) Field of Classification Search
  USPC .......................................................... 707/718
  See application file for complete search history.

(56) References Cited

U.S. PATENT DOCUMENTS

| | | | |
|---|---|---|---|
| 6,502,062 B1 | 12/2002 | Acharya et al. | |
| 6,859,529 B2 * | 2/2005 | Duncan et al. | ............. 379/266.1 |
| 2004/0148420 A1 | 7/2004 | Hinshaw et al. | |
| 2005/0192997 A1 * | 9/2005 | Dettinger et al. | ............. 707/102 |
| 2005/0278368 A1 * | 12/2005 | Benedikt et al. | ............. 707/101 |
| 2006/0069803 A1 | 3/2006 | Clark et al. | |
| 2007/0288649 A1 | 12/2007 | Song et al. | |
| 2007/0299812 A1 * | 12/2007 | Salch | ................................ 707/2 |
| 2009/0216718 A1 * | 8/2009 | Agrawal et al. | ................... 707/3 |

* cited by examiner

*Primary Examiner* — Amresh Singh
(74) *Attorney, Agent, or Firm* — Koestner Bertani LLP (57) ABSTRACT

A mixed workload management system and associated operating method modify a shortest job first (SJF) by service levels. The workload management system comprises a scheduler configured for scheduling mixed workloads. The scheduler comprises an analyzer that determines query execution time, assigns scheduling priority to a query in order inverse to the query execution time, weights the assigned scheduling priority by service level of the query, and sorts a list of queries in order of weighted scheduling priority. A schedule controller selects a query for execution from head of the sorted list of queries.

12 Claims, 8 Drawing Sheets

QUERY SCHEDULER

BACKGROUND

Much work has been done in the area of scheduling, as described by Peter Brucker, in *Scheduling Algorithms*, Springer-Verlag New York, Inc., Secaucus, N.J., 1995. Scheduling is considered in the database scenario by Bianca Schroeder, Mor Harchol-Balter, Arun Iyengar, Erich Nahum, Adam Wierman, "How to Determine a Good Multi-Programming Level for External Scheduling," icde, p. 60, 22*nd International Conference on Data Engineering (ICDE '06)*, 2006. Another work that describes scheduling in terms of multi-query optimization and operators is Sharaf, M. A., Chrysanthis, P. K., Labrinidis, A., and Pruhs, K. 2006, in "Efficient scheduling of heterogeneous continuous queries", in *Proceedings of the* 32*nd international Conference on Very Large Data Bases* (Seoul, Korea, Sep. 12-15, 2006). A number of different metrics have been used for the purpose of scheduling.

In the offline setting, Kellerer showed that single machine scheduling to minimize flow time is NP-hard to approximate with a factor of $\Omega(n^{0.5-\psi})$(Hans Kellerer, Thomas Tautenhahn, Gerhard J. Woeginger, "Approximability and nonapproximability results for minimizing total flow time on a single machine," *Proceedings of the twenty-eighth annual ACM symposium on Theory of computing*, p. 418-426, May 22-24, 1996, Philadelphia, Pa., United States). Thus preemption seems to be essential to obtaining tractable versions for the flow time measure, as discussed by Chandra Chekuri, Sanjeev Khanna, An Zhu, "Algorithms for minimizing weighted flow time", *Proceedings of the thirty-third annual ACM symposium on Theory of computing*, p. 84-93, July 2001, Hersonissos, Greece. With preemption in the unweighted case, shortest remaining processing time (SRPT) gives the optimal total flow time on a single machine. Stefano Leonardi, Danny Raz, "Approximating total flow time on parallel machines", *Proceedings of the twentyninth annual ACM symposium on Theory of computing*, p. 110-119, May 4-6, 1997, El Paso, Tex., United States, analyzed SRPT for the multiprocessor case and showed an $O(\min\{\log \psi, \log m/n\})$—competitive character, where $\psi$ is the ratio of the minimum to maximum job processing times and n and m indicate the number of jobs and number of machines respectively. Leonardi et al. further showed that no online algorithm can achieve a better competitive ratio. The weighted case is known to be NP-hard even on a single machine. Chekuri gives a semi-online algorithm for a single machine that is $O(\log_2 P)$—competitive. The algorithms are viewed as an offline algorithm providing an $O(\log_2 P)$ approximation in an polynomial time. Chekuri et al. present a quasi-PTAS that gives $(1+\psi)$—approximation solution for any instance of weighted flow time for the uniprocessor preemptive case. Becchetti forwards an algorithm in the resource augmentation scenario, Highest Density First, that is $O(1)$-speed $O(1)$ approximation solution for the problem of preemptive total flow. (Becchetti, L., Leonardi, S., Marchetti-Spaccamela, A., and Pruhs, K. 2001, "Online Weighted Flow Time and Deadline Scheduling," in *Proceedings of the* 4*th international Workshop on Approximation Algorithms For Combinatorial Optimization Problems and* 5*th international Workshop on Randomization and Approximation Techniques in Computer Science: Approximation, Randomization and Combinatorial Optimization* (Aug. 18-20, 2001). M. X. Goemans, K. Jansen, J. D. Rolim, and L. Trevisan, Eds. *Lecture Notes In Computer Science*, vol. 2129. Springer-Verlag, London, 36-47.)

For the maximum flow, Bender proves that in the non-preemptive case, FIFO is optimal for one processor and has a $(3-2/m)$—competitive ratio in an online setting for m>1 number of processors. (Michael A. Bender, Soumen Chakrabarti, S. Muthukrishnan, "Flow and stretch metrics for scheduling continuous job streams," *Proceedings of the ninth annual ACMSIAM symposium on Discrete algorithms*, p. 270-279, Jan. 25-27, 1998, San Francisco, Calif., United States). The metric of interested is the stretch metric which can be understood as a special case of the weighted flow case with the weights being inverse of the processing time. The stretch metric was first analyzed by Bender in the context of scheduling and proved that no online algorithm can approximate the max stretch to within a factor of $O(n^{0.5-\psi})$ unless P=NP for the non-preemptive case. In a preemptive offline case, Bender et al. prove that a polynomial time algorithm exists that, for any fixed °, generates as output a schedule having max-flow at most $1+\psi$ times the optimum max-stretch. For the preemptive online max stretch problem Bender gives an algorithm that has a competitive ratio of $O(\psi^{0.5})$. Bender's algorithm requires knowledge of the actual value of max stretch and is not sublinear in complexity. In a further development, Bender et al. give $O(\psi^{0.5})$ competitive ratio algorithm for max stretch and has a much lower complexity then their previous work. (Michael A. Bender, S. Muthukrishnan, Rajmohan Rajaraman, "Improved algorithms for stretch scheduling," in *Proceedings of the thirteenth annual ACM-SIAM symposium on Discrete algorithms*, p. 762-771, Jan. 6-8, 2002, San Francisco, Calif.). Maximum stretch is also considered in Legrand who provide a heuristic for the online multiprocessor case. (Legrand, A., Su, A., and Vivien, F., "Minimizing the stretch when scheduling flows of biological requests," in *Proceedings of the Eighteenth Annual ACM Symposium on Parallelism in Algorithms and Architectures* (Cambridge, Mass., USA, Jul. 30-Aug. 2, 2006)). Bender et al. also provide a $(1+\psi)$—polynomial time approximation scheme for average stretch. S. Muthukrishnan, Rajmohan Rajaraman, Anthony Shaheen, Johannes E. Gehrke, "Online Scheduling to Minimize Average Stretch", *Proceedings of the* 40*th Annual Symposium on Foundations of Computer Science*, p. 433, Oct. 17-18, 1999 show that SRPT is 2-competitive for a uniprocessor case with respect to average stretch. In the same work Muthukrishnan et al. show that SRPT is 14-competitive for the multiprocessor case. Legrand et al. also give new bounds for sum-stretch. Luca Becchetti, Stefano Leonardi, S. Muthukrishnan, "Scheduling to minimize average stretch without migration," *Proceedings of the eleventh annual ACM-SIAM symposium on Discrete algorithms*, p. 548-557, Jan. 9-11, 2000, San Francisco, Calif., United States discuss average stretch in the context of non-migration of jobs. Online scheduling is discussed extensively in Pruhs. (K. Pruhs, E. Torng and J. Sgall, "Online scheduling," in Joseph Y.-T. Leung, Editor, *Handbook of Scheduling: Algorithms, Models, and Performance Analysis*, CRC Press (2004), pp. 15-1-15-41 (Chapter 15)). Another paradigm is stochastic online scheduling which is discussed in Megow. (Megow, N., Uetz, M., and Vredeveld, T. 2006. "Models and Algorithms for Stochastic Online Scheduling," in *Math. Oper. Res.* 31, 3 (August 2006), 513-525). Semi-clairvoyant scheduling is discussed in Becchetti. (Becchetti, L., Leonardi, S., Marchetti-Spaccamela, A., and Pruhs, K. 2004. "Semi-clairvoyant scheduling," in *Theor. Comput. Sci.* 324, 2-3 (September 2004), 325-335). Non-clairvoyant scheduling is considered in Bansal. (Bansal, N., Dhamdhere, K., and Sinha, A. 2004"Non-Clairvoyant Scheduling for Minimizing Mean Slowdown," in *Algorithmica* 40, 4 (September 2004), 305-318). Various heuristics such as Most Requests First, First Come First Served, and Longest Wait First were considered in wireless context by Kalyan (Bala Kalyanasundaram, Kirk Pruhs, Mahendran Velauthapillai, "Scheduling Broadcasts in Wireless Networks," in *Proceedings of the 8th Annual European Symposium on Algorithms*, p. 290-301, Sep. 5-8, 2000), in webservers by Friedman (Friedman, E. J. and Henderson, S. G. 2003. "Fairness and efficiency in web server protocols," in *Proceedings of the 2003 ACM SIGMETRICS international Conference on Measurement and Modeling of Computer Systems* (San Diego, Calif., USA, Jun. 11-14, 2003). SIGMETRICS '03. ACM, New York, N.Y., 229-237) and Crovella (Crovella, M. E., Frangioso, R., and Harchol-Balter, M. 1999. "Connection scheduling in web servers," in *Proceedings of the 2nd Conference on USENIX Symposium on internet Technologies and Systems*—Volume 2 (Boulder, Colo., Oct. 11-14, 1999). USENIX Association, Berkeley, Calif., 22-22). Another useful work is by Bedekar in the context of CDMA. (Bedekar, A., Borst, S. C., Ramanan, K., Whiting, P. A., and Yeh, E. M. 1999 "Downlink Scheduling in CDMA Data Networks," in Technical Report. UMI Order Number: PNA-R9910., CWI (Centre for Mathematics and Computer Science)).

SUMMARY

Embodiments of a mixed workload management system and associated operating method modify a shortest job first (SJF) by service levels. The workload management system comprises a scheduler configured for scheduling mixed workloads. The scheduler comprises an analyzer that determines query execution time, assigns scheduling priority to a query in order inverse to the query execution time, weights the assigned scheduling priority by service level of the query, and sorts a list of queries in order of weighted scheduling priority. A schedule controller selects a query for execution from head of the sorted list of queries.

BRIEF DESCRIPTION OF THE DRAWINGS

Embodiments of the invention relating to both structure and method of operation may best be understood by referring to the following description and accompanying drawings.

DETAILED DESCRIPTION

Embodiments of systems and methods schedule queries using a shortest job first (SJF) technique modified by service levels.

Shortest job first (SJF) is a popular algorithm for scheduling. Service levels enable improved functionality of an Enterprise Data Warehouse (EDW). The disclosed systems and techniques set forth a method for adding service levels to the popular SJF algorithm.

Enterprise data warehouses (EDW) are expected to execute a continuous stream of queries. The challenge is to schedule the queries in a "good" and a "fair" way. The understanding of "good" and "fair" can lead to several different metrics such as average flow time, total weighted flow time, makespan, and the like. Flow time is the difference between the end time and the arrival time of a query. Additionally for the same metric, either the average or the maximum of the metric can be monitored. The average value of a metric is a good way to measure how efficient a system is with regards to the metric. For the popular flow metric, which measures the time a query spent in the system, Shortest Job First (SJF) is known to minimize the value for average flow. The idea behind SJF is simple. In a non-preemptive setting, SJF executes the query with shortest expected execution time. Another aspect of operation for an EDW in addition to efficiency is enablement of service levels for the user, since queries can have different levels of expectation of services. For example, a query from a Chief Executive Officer (CEO) of an enterprise may be assigned the highest service level and have additional importance compared to other queries. The illustrative systems and techniques enable a method for scheduling that enhances SJF with service levels.

The illustrative systems and techniques can consider the non-preemptive case of the related problem of stretch. A problem in scheduling is that of total weighted flow time. Until recently, no provably good non-trivial algorithms were known for either the weighted or the un-weighted versions of minimizing the total flow time. In fact, the non-preemptive case is intractable in the strong sense for both online and offline setting. In the online setting, no algorithm can achieve a competitive ratio better than O(n), where n is the number of jobs. An algorithm is c-competitive if the objective value of the algorithm is at most c times the optimal value for the offline case on any input. The competitive ratio is infimum (the greatest lower bound) of all such c's. When weights are allowed, no online algorithm can achieve a non-trivial competitive ratio.

In contrast to the cited references, the systems and techniques disclosed herein address a new problem, supplying heuristics for non-preemptive case for n=1 processor and where the objective function is the $l_2$ and $l_3$ norm of stretch which is relevant to the database scenario.

Flow time $f_i$ for a query $q_i$ is defined as $f_i=e_i-a_i$, where $e_i$ is the end time of the query and $a_i$ is the arrival time of the query. Shortest Job First (SJF) is known to minimize the average value of flow time $F_{avg}$, for example by minimizing the expression $F_{avg}=(\Sigma f_i)/n$, where n is the number of queries to be scheduled. SJF has a simple purpose. In a non-preemptive setting, the query with the shortest expected execution time is scheduled.

In an example specific implementation, a list L of queries $q_i$ is maintained and sorted based on execution times $p_i$ such that the query with the lowest execution time is at the head of the list L. At any point, the query is inserted for execution from the head of the list L.

A modification of the SJF scheme incorporates service levels. For every query $q_i$ weight $w_i$ is computed as $w_i=(SL)_i/p_i$, where $SL_i$ is the service level of the query and $p_i$ is the execution time of the query. A list L of queries $q_i$ is maintained which is sorted based on query weights $w_i$ such that the query with the highest weight is at the head of the list L. At any point, the query for execution is inserted from the head of the list L. The illustrative scheme can be called Shortest Job First with Service Levels.

The illustrative approach has several advantages and exploits beneficial properties of SJF while introducing service levels. In terms of efficiency, as in minimizing the flow metric, the illustrative approach behaves similar to SJF which is known to minimize the average flow. The technique also enables a user to incorporate service levels with an efficient scheduling algorithm.

The scheme is non-preemptive. Preempting frequently can also prove to be an expensive operation for an EDW where the arrival rate of queries is very large and many queries are very small. Preemption adds an unnecessary overhead.

The technique can be implemented as an external approach. The advantage of an external approach is portability, ease of implementation, and can be implemented without complex changes to the internals of a data base management system (DBMS). The technique can be applied across different classes of workloads, since (unlike the internal approach which directly schedules the resources inside the backend DBMS) external scheduling works independently of system's bottleneck resources.

The illustrative approach can be implemented online. In the online model, the algorithm does not have information regarding all the instances ahead of time. The complexity of the approach is O(1) which is useful since otherwise the algorithm can be too expensive to use in a real life scenario.

Figure 1A:
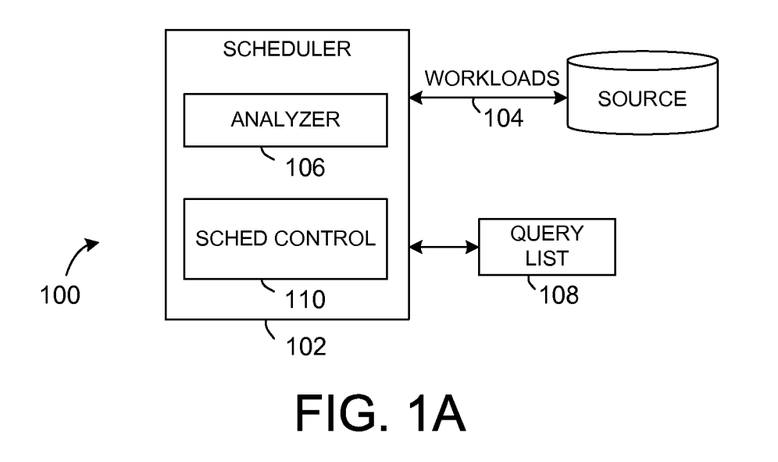
FIGS. 1A, 1B, and 1C are schematic block diagrams showing an embodiment of a workload management system that modifies a shortest job first (SJF) by service levels.

Referring to FIG. 1A, a schematic block diagram illustrates an embodiment of a workload management system 100 that modifies a shortest job first (SJF) by service levels. The workload management system 100 comprises a scheduler 102 configured for scheduling mixed workloads 104. The scheduler 102 comprises an analyzer 106 that determines query execution time, assigns scheduling priority to a query in order inverse to the query execution time, weights the assigned scheduling priority by service level of the query, and inserts a list of queries 108 in order of weighted scheduling priority in order to behave as sorted. A schedule controller 110 selects a query for execution from head of the sorted list of queries 108.

Figure 1B:
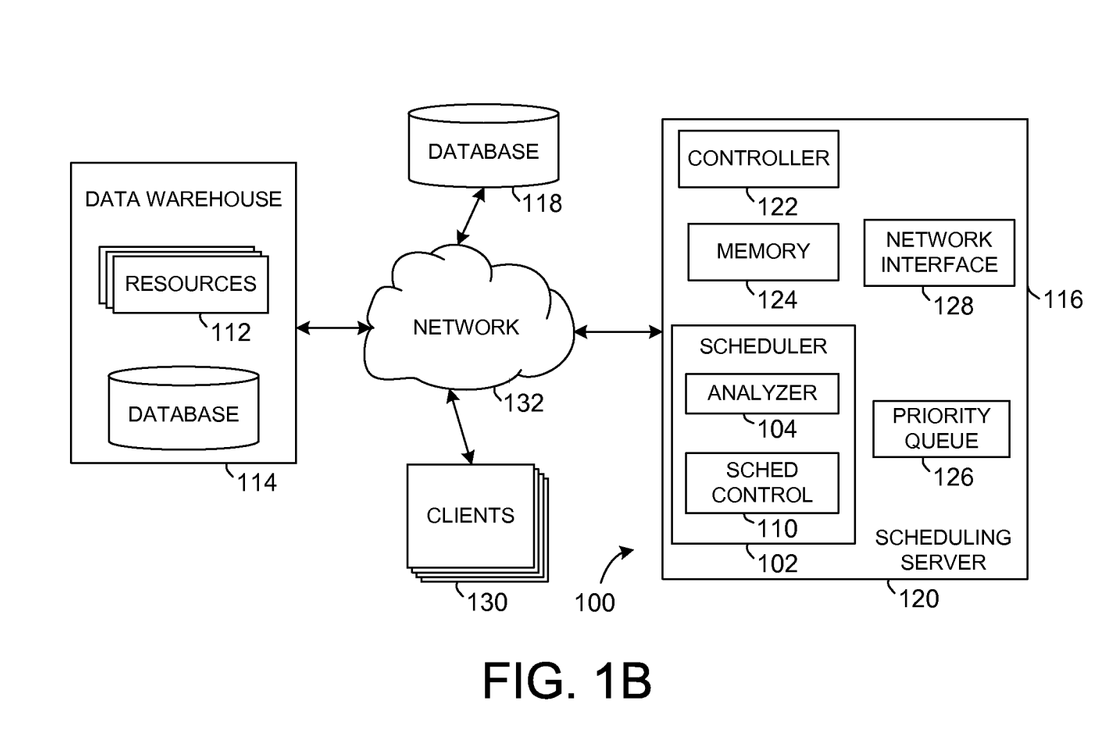

Referring to FIG. 1B, a schematic block diagram shows an embodiment of a workload management system 100 further comprising a scheduling server 120. The scheduling server 120 comprises a controller 122 configured to execute the scheduler 102, a memory 124 coupled to the controller 122 comprising a priority queue 126 holding the scheduled queries 108. The scheduling server 120 further comprises a network interface 128 coupled to the controller 122 that interfaces the scheduling server 120 to a plurality of clients 130 via a network 132.

The workload management system 100 can further comprise a resource 112 that non-preemptively executes the selected query.

In some implementations, the workload management system 100 can further comprise one or more resources 112 that execute a stream of queries in a data warehouse 114 in order of query selection.

The scheduler 102, for every query $q_i$ in a list of queries, can be configured to compute weight $w_i$ for the query $q_i$ as $w_i = (SL_i)/p_i$ where $SL_i$ is service level of the query $q_i$ and $p_i$ is execution time of the query $q_i$.

The scheduler 102 can be configured to maintain a list L of queries $q_i$, and sort the list L based on weights $w_i$ wherein a query q with highest weight w heads the list L.

The scheduler 102 selects for execution at any time a query at the head of the list L.

The scheduler 102 can schedule queries from a location 116 external to a database 118 for which the queries are scheduled.

The scheduler 102 can schedule queries via online access to a database 118 for which the queries are scheduled.

Figure 1C:
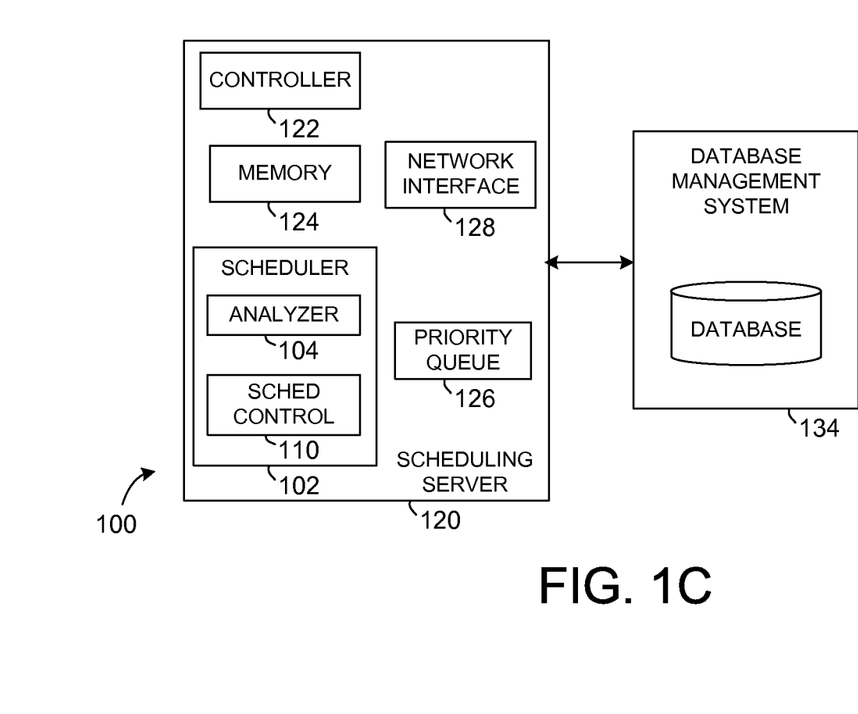

Referring to FIG. 1C, a schematic block diagram shows an embodiment of a workload management system 100 further comprising a scheduling server 120 configured for scheduling queries 108 for execution by a database management system 134. The scheduling server 120 comprises a priority queue 126 that queues the plurality of queries 108 for execution by the database management system 134, and the scheduler 120 which maintains the priority queue 126 as a single queue of queries for selection for execution by the database management system 134.

Figure 2:
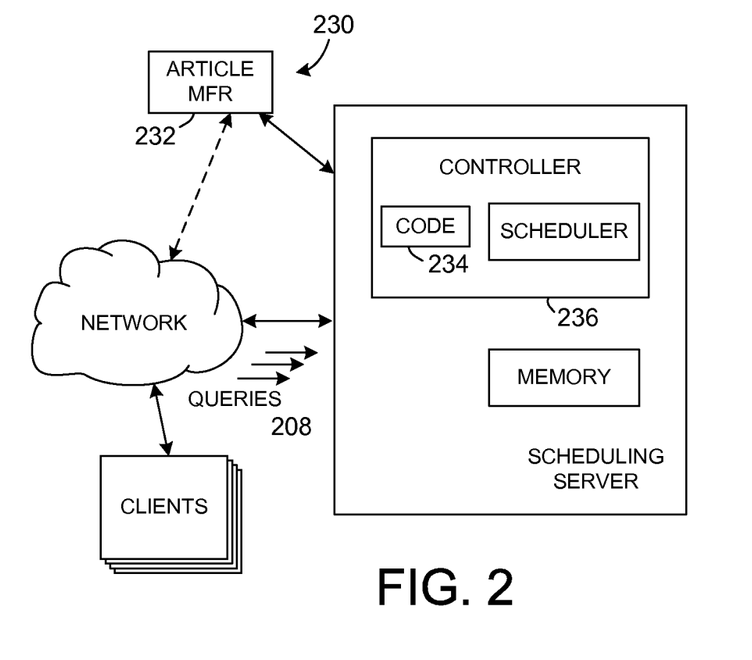
FIG. 2 is a schematic block diagram depicting an embodiment of an article of manufacture that modifies a shortest job first (SJF) by service levels.

Referring to FIG. 2, a schematic block diagram depicts an embodiment of an article of manufacture 230 that modifies a shortest job first (SJF) by service levels. The article of manufacture 230 comprises a controller-usable medium 232 having a computer readable program code 234 embodied in a controller 236 for the controller-usable medium 232 having a computer readable program code embodied in a controller for scheduling queries 208. The computer readable program code 234 further comprises code causing the controller 236 to assign scheduling priority to a query in order inverse to query execution time. A code causes the controller 236 to weight the assigned scheduling priority by service level of the query. A code causes the controller 236 to sort a list of queries in order of weighted scheduling priority. A code causes the controller 236 to select a query for execution from head of the sorted list of queries.

Figure 3A:
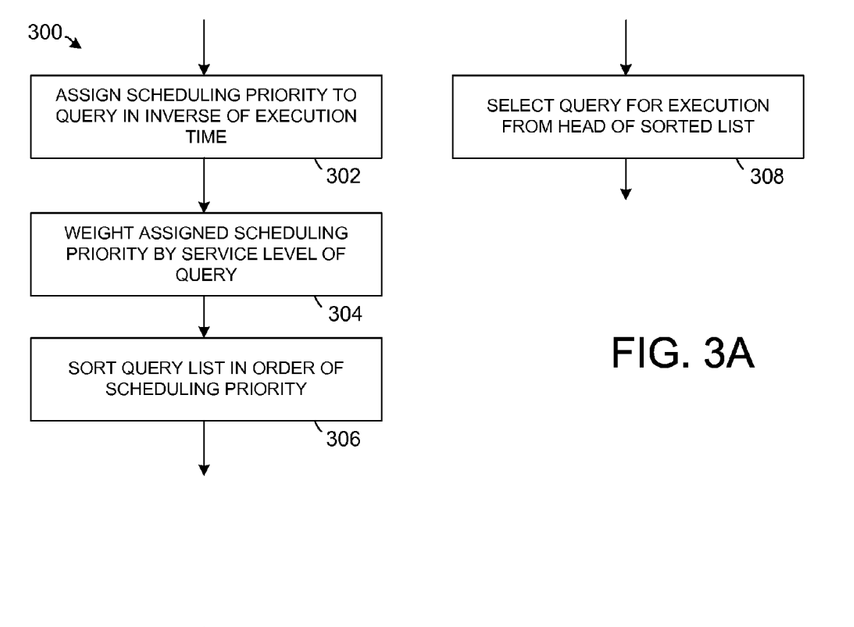
FIGS. 3A through 3D are flow charts illustrating one or more embodiments or aspects of a computer-executed method for modifies a shortest job first (SJF) by service levels.

Referring to FIGS. 3A through 3D, flow charts illustrate one or more embodiments or aspects of a computer-executed method for modifies a shortest job first (SJF) by service levels. As shown in FIG. 3A, the method 300 for scheduling queries comprises assigning 302 scheduling priority to a query in order inverse to query execution time, weighting 304 the assigned scheduling priority by service level of the query, and sorting 306 a list of queries in order of weighted scheduling priority. A query for execution is selected 308 from head of the sorted list of queries.

Figure 3B:
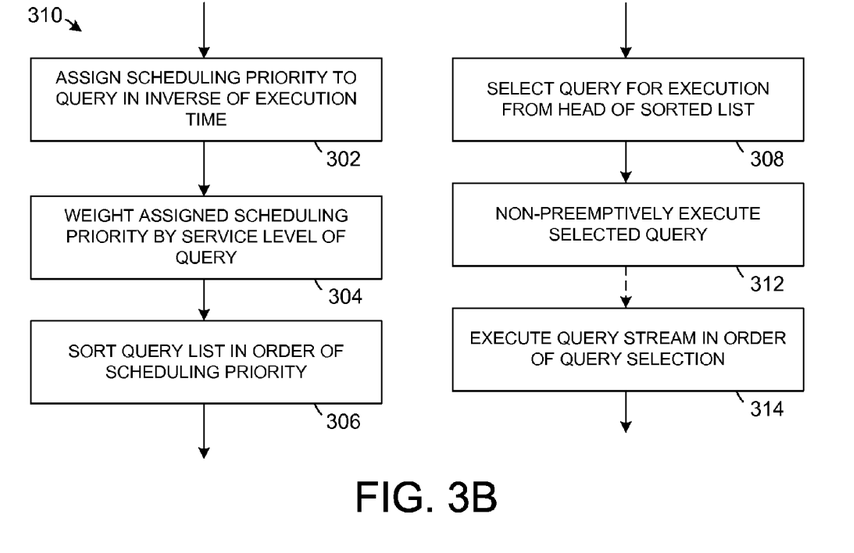

Referring to FIG. 3B, a method for scheduling 310 queries can further comprise non-preemptively executing 312 the selected query.

In some embodiments, the method for scheduling 310 queries can further comprise executing 314 a stream of queries in a data warehouse in order of query selection.

Figure 3C:
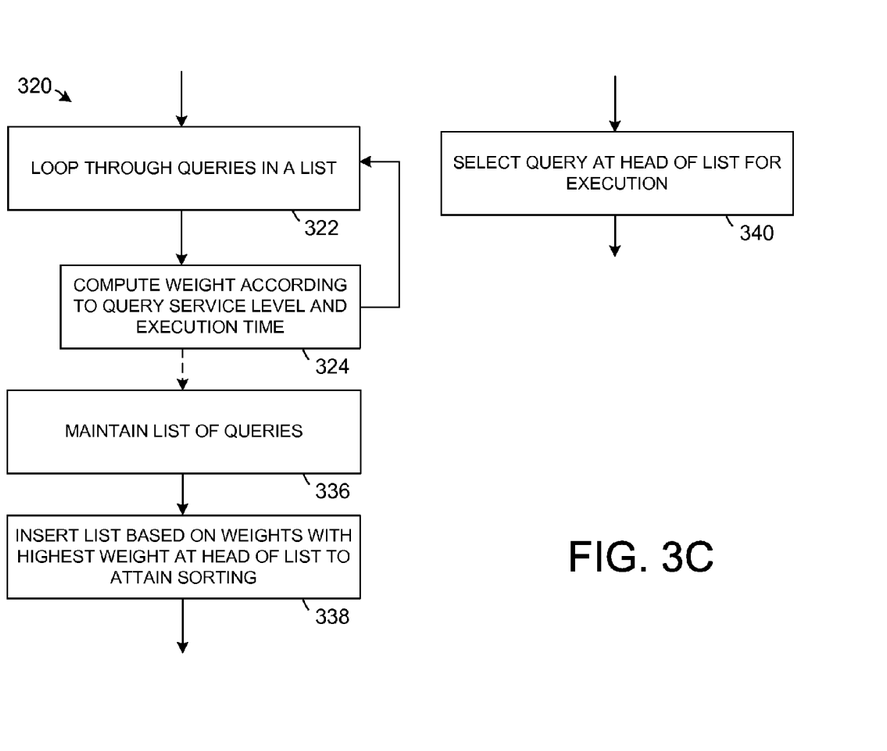

Referring to FIG. 3C, an aspect 320 of a method for scheduling queries can comprise looping 322 through every query $q_i$ in a list of queries. Weight $w_i$ is computed 324 for the query $q_i$ as $w_i = (SL_i)/p_i$ where $SL_i$ is service level of the query $q_i$ and $p_i$ is execution time of the query $q_i$.

In some embodiments, the method can further comprise maintaining 336 a list L of queries $q_i$, and inserting 338 the list L based on weights $w_i$ wherein a query q with highest weight w heads the list L to attain behavior of sorting.

The method can further comprise selecting 340 for execution a query at the head of the list L at any time.

Figure 3D:
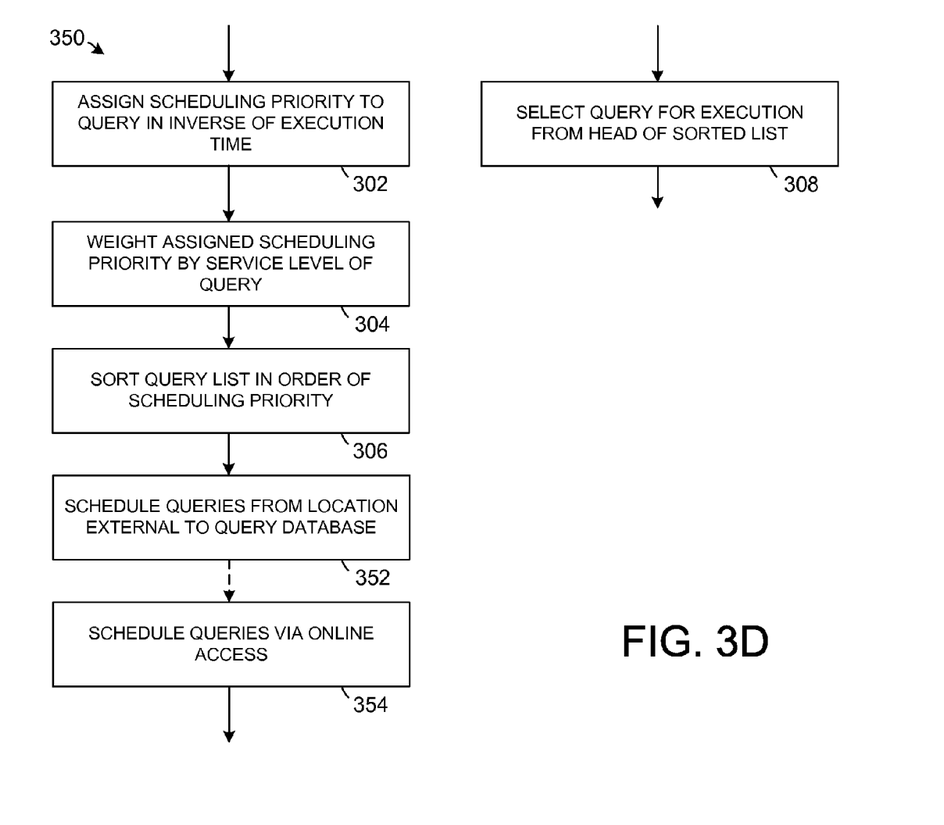

Referring to FIG. 3D, a method for scheduling 350 queries can further comprise scheduling 352 queries from a location external to a database for which the queries are scheduled.

The method 350 can further comprise scheduling 354 queries via online access to a database for which the queries are scheduled.

Figure 4:
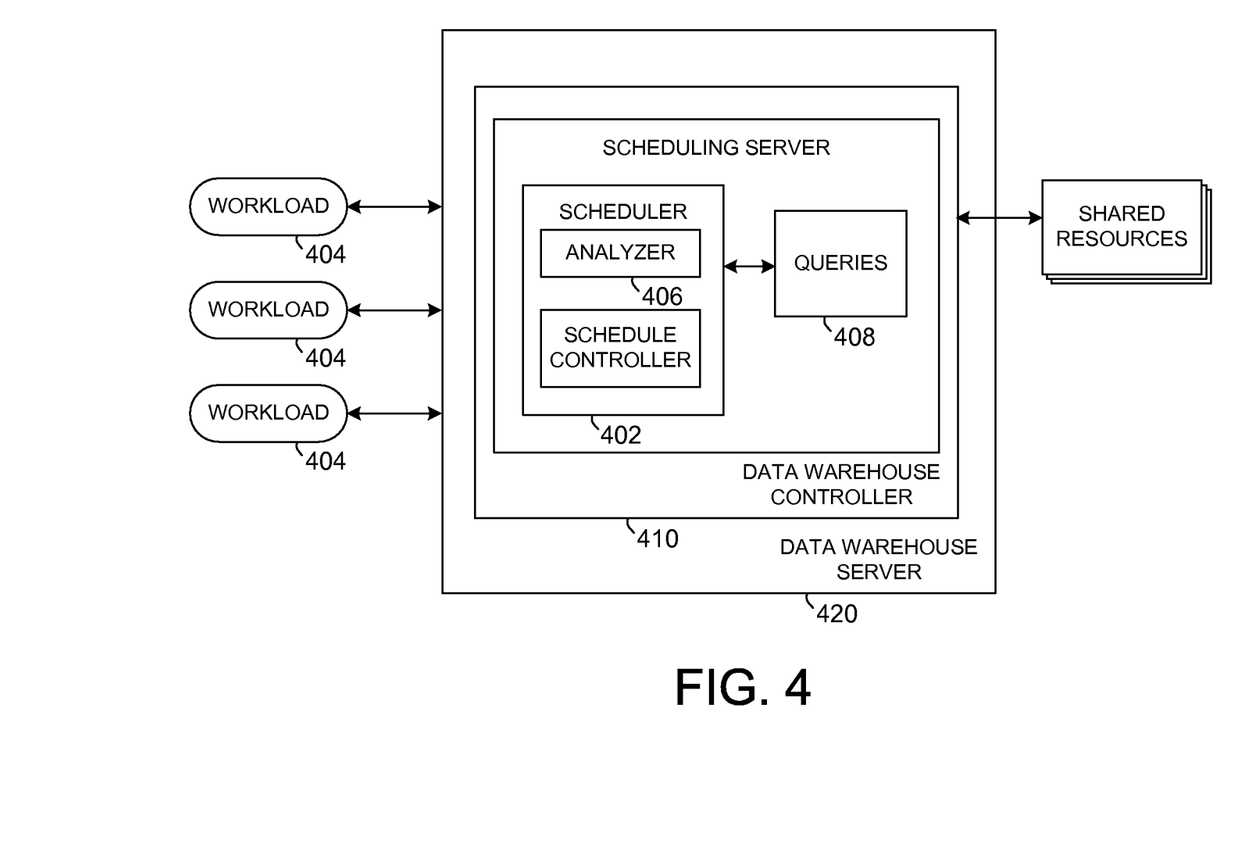
FIG. 4 is a schematic block diagram showing an embodiment of a data warehouse server that modifies a shortest job first (SJF) by service levels.

Referring to FIG. 4, a schematic block diagram illustrates an embodiment of a data warehouse server 420 that modifies a shortest job first (SJF) by service levels. The data warehouse server 420 comprises a data warehouse controller 410, a plurality of workloads 404 communicatively coupled to the data warehouse controller 410, and a scheduler 402 coupled to the data warehouse controller 410 configured for scheduling queries 408. The scheduler 402 comprises an analyzer 406 that determines query execution time, assigns scheduling priority to a query in order inverse to the query execution time, weights the assigned scheduling priority by service level of the query, and sorts a list of queries 408 in order of weighted scheduling priority. The scheduler 402 further comprises a schedule controller 410 that selects a query for execution from head of the sorted list of queries 408.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A method for scheduling queries, comprising:
    assigning scheduling priorities to a plurality of queries the scheduling priorities to place the queries in an order inverse to the respective query execution times of the respective queries, the queries submitted by users ranked in a hierarchy;
    weighting, via a logic circuit, the previously assigned scheduling priorities according to the ranks of the users in the hierarchy to generate weighted scheduling priorities;
    sorting a list of the queries in order based on the weighted scheduling priorities to incorporate both the ranks of the users and the query execution times of the respective queries in the sorted list;
    selecting a first query for execution from a head of the sorted list of queries;
    executing the first query to completion without preemption by other queries from the sorted list; and
    executing a stream of queries from the sorted list, wherein weighting the scheduling priorities comprises computing a weight $w_i$ for each query, $q_i$, in the queries as $w_i=(SL_i)/p_i$, where $SL_i$ is a service level associated with the rank in the hierarchy of the user corresponding to the query $q_i$, and $p_i$ is the execution time of the corresponding query $q_i$.

2. The method according to claim 1 wherein the ranks are representative of an expectation of service associated with respective positions in an organizational structure of an entity.

3. The method according to claim 1 wherein weighting the assigned scheduling priorities according to the ranks of the users in the hierarchy comprises computing a product of a service level corresponding to the rank of the respective users in the hierarchy and an inverse of the query corresponding execution time.

4. The method according to claim 1, wherein a first rank of the user is indicative of an expectation of service associated with a position of the user in an organization.

5. A workload management system comprising:
    a processor; and
    a memory comprising machine-readable instructions that, when executed, cause the processor to at least:
        determine an execution time of a first query submitted by a first user;
        assign a scheduling priority to the first query based on an execution time of the first query;
        weight the previously assigned scheduling priority according to a rank of the first user in a hierarchy of an organization to generate weighted scheduling priorities;
        add the first query to a sorted list of queries based on a corresponding one of the weighted scheduling priorities;
        select a query for execution from a head of the sorted list of queries;
        execute the selected query to completion without preemption by other queries from the sorted list; and
        execute a stream of queries from the sorted list, wherein to weight the previously assigned scheduling priorities comprises computing a weight $w_i$ for each query, $q_i$, in the queries as $w_i=(SL_i)/p_i$, where $SL_i$ is a service level associated with the rank in the hierarchy of the user corresponding to the query $q_i$, and $p_i$, is the execution time of the corresponding query $q_i$.

6. The system according to claim 5 further comprising:
    a second memory to store the sorted list of queries; and
    a network interface to communicatively couple the system to a plurality of clients via a network.

7. The system according to claim 5 further comprising:
    a resource to execute the stream of queries in the data warehouse in order of query selection.

8. The system according to claim 5 wherein the machine-readable instructions, when executed, further cause the processor to sort the list of queries based on the weights $w_i$.

9. The system according to claim 5 wherein the system is implemented separately from a database for which the queries are scheduled.

10. The system according to claim 5 wherein the machine-readable instructions, when executed, further cause the processor to queue the queries of the sorted list of queries for execution by a database management system based on corresponding positions in the sorted list of queries.

11. The system according to claim 5, wherein the first rank of the user is indicative of an expectation of service associated with a position of the user in the organization.

12. A tangible machine-readable storage medium comprising instructions that, when executed, cause a machine to at least:
- assign a priority to a first query submitted by a first user based on an execution time associated with the first query;
- weight the priority according to a rank of the first user in a hierarchy to generate weighted scheduling priorities;
- sort a list of queries including the first query in order based on the weighted scheduling priorities to incorporate both the ranks of the first user and the execution times of the first query in the sorted list;
- select a query for execution from a head of the sorted list of queries;
- execute the selected query to completion without preemption by other queries from the sorted list; and
- execute a stream of queries from the sorted list, wherein to weight the scheduling priorities comprises computing a weight $w_i$ for each query, $q_i$, in the queries as $w_i=(SL_i)/p_i$, where $SL_i$, is a service level associated with the rank in the hierarchy of the user corresponding to the query $q_i$, and $p_i$ is the execution time of the corresponding query $q_i$.

* * * * *

UNITED STATES PATENT AND TRADEMARK OFFICE
CERTIFICATE OF CORRECTION

PATENT NO. : 9,047,124 B2
APPLICATION NO. : 12/251293
DATED : June 2, 2015
INVENTOR(S) : Abhay Mehta et al.

Page 1 of 1

It is certified that error appears in the above-identified patent and that said Letters Patent is hereby corrected as shown below:

In the Claims

In column 9, line 20, in Claim 12, delete "$SL_i$," and insert -- $SL_i$ --, therefor.

Signed and Sealed this
First Day of December, 2015

Michelle K. Lee
*Director of the United States Patent and Trademark Office*